May 27, 1969  N. COHEN  3,446,007

PALLET TYPE INDEX MECHANISM

Filed Dec. 18, 1967

INVENTOR
NATHAN COHEN

BY Le Blanc & Shur

ATTORNEYS

United States Patent Office 3,446,007
Patented May 27, 1969

3,446,007
PALLET TYPE INDEX MECHANISM
Nathan Cohen, Philadelphia, Pa., assignor to Hamilton Watch Company, Lancaster, Pa., a corporation of Pennsylvania
Filed Dec. 18, 1967, Ser. No. 691,447
Int. Cl. G04c 3/04
U.S. Cl. 58—28                                                   13 Claims

ABSTRACT OF THE DISCLOSURE

The index mechanism comprises a pallet pivoted at one end for rocking movement on a pallet plate and an oscillating roller having a pin engaging within the forked other end of the pallet to rock the latter. The pivoted end of the pallet has laterally extending table portions, the ends of which pivotally mount the ends of a pair of pallet arms. The opposite ends of the pallet arms engage teeth on an index wheel to advance the same in a single forward direction. Each pallet arm extends between a pair of pins mounted on the table portions, the inner pin associated with one of the pallet arms magnetically biasing the arm into engagement with the index wheel while the outer pin associated with the other arm magnetically biases the other arm into engagement with the index wheel teeth. The pallet arms alternately advance the index wheel on opposite strokes of the pallet.

BACKGROUND OF THE INVENTION

The present invention relates to an index mechanism for a watch and more particularly relates to an index mechanism of a double acting pallet type for an electrically powered watch wherein the pallet arms are magnetically biased to alternately engage the teeth of the index wheel to step the latter in a single direction with a minimum energy loss.

In electric watches of the type having an oscillatory balance wheel serving to transmit the motive power, it is necessary to provide an indexing mechanism which will receive the power from the oscillating movement of the balance wheel and transform these oscillations into rotary motion in a single direction to drive the watch gear train. Generally speaking, indexing may be performed by rocking or oscillating a pallet about a fixed pivot by means of a roller and roller pin assembly driven from the oscillating balance wheel and engaging one end of the pallet. The opposite oscillating end of the pallet periodically engages a toothed index wheel to drive the wheel in step-by-step fashion.

It will be appreciated that the reduction in size of the motive power (battery) necessary to locate the same within a compact electric watch decreases its driving capacity and at a rate far more rapidly than total resistance to watch movement is decreased by a proportionate decrease in the size of the movement. For the relatively small electric watches, for example, a lady's electric watch, a given reduced power source must overcome a substantially greater resistance than in larger electric watches and accordingly a decrease in the total energy necessary to drive the movement is very desirable in order to permit reduction in battery size and to extend battery life.

Prior watch index mechanisms often employ a pallet having a pair of fixed pallet arms for alternately engaging the index wheel teeth to successively step the index wheel in a single forward direction. The pallet driving action is usually directed chordwise and often practically radially along the index wheel with the pallet arm tips camming and sliding along the faces of the teeth with consequent high energy losses due to the frictional resistance therebetween. Other types of indexing systems provide pallet arms mechanically biased into engagement against the index wheel teeth with the bias having an increasing magnitude and hence an increasing frictional loss as the pallet pivots through a single stroke. The motive force (battery) in these prior watches must have sufficient capacity to overcome these high frictional losses, thereby requiring larger batteries than would otherwise be desirable or geometrically possible for the small electric watches of the type herein contemplated.

SUMMARY OF THE INVENTION

According to the present invention, a pallet is mounted for rocking movement and a pair of arms are pivotally mounted on the pallet on opposite sides of the pivotal axis thereof. The arms project to engage the teeth on an index wheel to alternately drive the latter unidirectionally on each pallet stroke. The arms project past magnetic pins carried on the pallet providing an attracting force biasing the arms toward the pins and in following engagement against the teeth.

As the pallet rocks in one direction, one of the arms drives the index wheel and pivots away from its associated pin to progressively decrease the bearing pressure of the driving arm against the index wheel teeth. Simultaneously, the tip of the other arm is withdrawn over the next succeeding index wheel tooth on the return stroke of the arm until the tip drops from such tooth just before the pallet is banked. The arm then pivots toward its associated magnetic pin. The bearing pressure of the returning arm is thus substantially constant for the greater part of the return stroke. The net frictional loss caused by the bearing pressure between the arms and teeth is accordingly very nearly constant for both pallet strokes and of a magnitude at any one time not significantly greater than the frictional loss occassioned by the initial movement of a single driving arm away from its associated magnetic pin at the beginning of its driving stroke.

Accordingly, it is a primary object of the present invention to provide a watch index mechanism of the pallet type in which the frictional energy losses are minimal.

It is another object of the present invention to provide a watch index mechanism of the double action pallet type in which the index wheel is stepped for each pallet stroke with a minimum of frictional energy loss.

It is a further object of the present invention to provide an index mechanism of the double acting pallet type having a pair of pivoted arms cooperating with a pair of magnets to reduce the magnitude of the total motive force required to step the index wheel.

It is a still further object of the present invention to provide a watch index mechanism of the double acting pallet type having a pair of arms magnetically biased into following engagement with the index wheel wherein the bearing pressure and hence friction energy losses occasioned by such engagement progressively decreases on the drive stroke of the pallet arms.

It is a further object of the present invention to provide an index mechanism of the double acting pallet type having the foregoing characteristics wherein the arms engage and drive the index wheel substantially tangentially thereto for each stroke of the pallet.

These and further objects and advantages of the invention will become more apparent upon reference to the following specification, claims, and appended drawings.

DESCRIPTION OF THE DRAWING FIGURES

DESCRIPTION OF A PREFERRED EMBODIMENT

Figure 1:
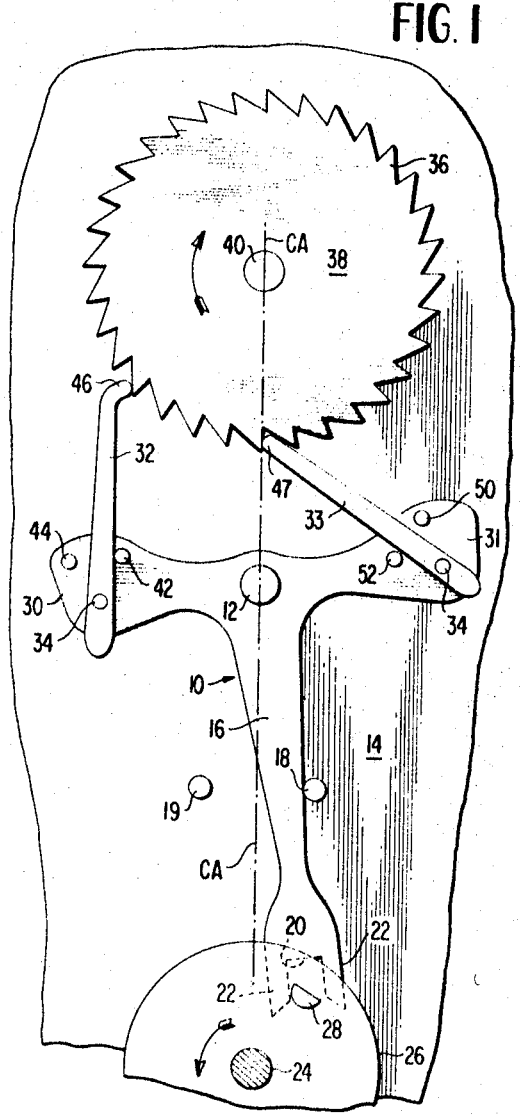
FIGURE 1 is a plan view of an index mechanism constructed in accordance with the present invention illustrating the position of the pallet and pallet arms at the beginning of a drive stroke in one direction.
Figure 2:
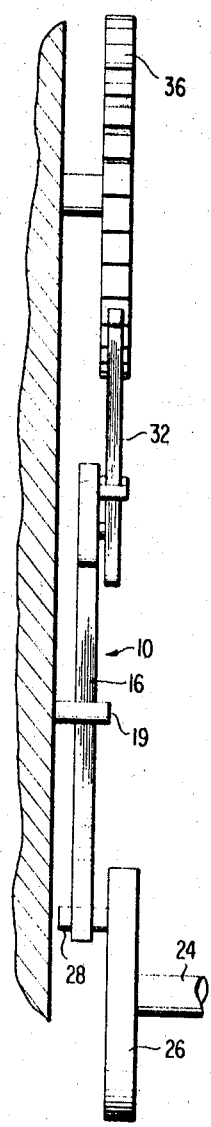
FIGURE 2 is an elevational view thereof.

Referring more particularly to the drawings, a pallet generally designated 10 is pivotally mounted adjacent one end as at 12 to a pallet plate 14. Pallet 10 has a central arm 16 and a pair of laterally spaced banking pins 18 and 19 upstanding from plate 14 on opposite sides of central arm 16. The opposite end of arm 16 is bifurcated to form a pallet fork having a recess 20 between legs 22 in the usual fashion. A balance staff 24, carrying an indexing roller 26 mounting a depending roller pin 28, is drivingly connected to a suitably mounted balance wheel, not shown, for oscillating roller pin 28 in the conventional manner. Roller pin 28 is mounted to releasably engage within recess 20 to rock pallet 10 about pivot 12 in opposite directions, the rocking movement in either direction being arrested by the engagement of central arm 16 against the respective banking pins 18 and 19. Banking pins 18 and 19 may comprise permanent magnets to retain central pallet arm 16 in the banked arrested position to one side or the other of a central axis CA, as seen in FIGURE 1, as roller pin 28 rotates out of recess 20 to complete its oscillatory excursions.

A pair of lateral tables 30 and 31 are integrally formed on opposite sides of the pallet 10 and extend from opposite sides thereof adjacent pallet pivot 12. The forward end of pallet 10 is crescent-shaped to reduce the weight of material and the inertia thereof. End portions of a pair of pallet arms 32 and 33 are pivotally mounted as at 34 on tables 30 and 31 respectively, adjacent the lateral extremities thereof, the opposite ends of arms 32 and 33 extending forwardly to engage the teeth 36 formed on an index wheel 38 pivotally mounted on pallet plate 12 as at 40. Index wheel 38 is suitably geared to and drives the watch gear train by means not shown.

As seen in FIGURE 1, upstanding pins 42 and 44 are mounted on table 30 on opposite sides of pallet arm 32 and forwardly of pivotal mounting 34. When pallet 10 lies in the position illustrated in FIGURE 1 and central arm 16 bears against the banking pin 18 to one side of central axis CA, arm 32 preferably engages against although may be slightly spaced from pin 42 while the tip 46 of arm 32 simultaneously engages between adjacent teeth 36 of index wheel 38. Pallet arm 32 is thus in position to rotate index wheel 38 in the clockwise direction as pallet 10 is pivoted in the clockwise direction on the counterclockwise excursion of roller pin 28. Pin 44 is spaced outwardly of pin 42 to permit rotation of arm 32 between pins 42 and 44 and is located in position to limit further counterclockwise rotation of arm 32 relative to table 30 at the end of the drive stroke of arm 32 as hereinafter more fully described. As seen in FIGURE 1, arm 32 extends outwardly of a straight line intersecting its pivot axis 34 and axis 40 to engage index wheel 38 at a point thereabout very nearly tangent to wheel 38 at the beginning of its drive stroke.

Figure 3:
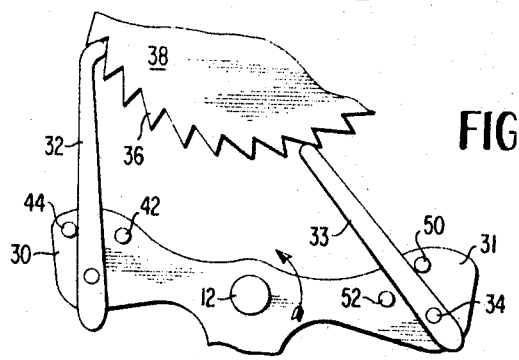
FIGURE 3 is a fragmentary plan view of the pallet and arms therefor at the beginning of the opposite drive stroke.

Pallet arm 33 extends inwardly of a straight line intersecting the axis 34 thereof and pivotal axis 40 of index wheel 38 to engage outer end 47 thereof between teeth 36 of index wheel 38 at a point very nearly tangent to wheel 38. Arm 33 is thus in position to advance index wheel 38 in a clockwise direction as seen in FIGURE 3 on the opposite counterclockwise rocking stroke of pallet 10, the position of arm 33 in FIGURE 1 showing the same at the end of its drive stroke. Upstanding pins 50 and 52 are mounted on opposite sides of arm 33 on table 31 and forwardly of pivotal axis 34, arm 33 pivoting between pins 50 and 52. Pin 52 is spaced inwardly and rearwardly of pin 50 to limit further counterclockwise rotation of arm 33 relative to table 31 at the end of the drive stroke of pallet arm 33 as hereinafter more fully described. Outer pin 50 is located such that when pallet 10 is pivoted against banking pin 19, pin 50 preferably engages although may be slightly spaced inwardly of arm 33, further outward (clockwise as seen in FIGURE 1) pivotal movement of arm 33 about axis 40 being restrained by the following engagement of tip 47 thereof against teeth 36.

It is a significant feature hereof that the driving tips 46 and 47 of arms 32 and 33 respectively are retained for engagement against teeth 36 on index wheel 38 in a manner providing for minimal friction losses. To this end, pins 42 and 50 are formed to comprise permanent magnets. Arms 32 and 33 are accordingly magnetically biased for rotation (clockwise as seen in FIGURE 1) in a direction so that respective tips 46 and 47 are maintained in engagement against teeth 36. It will thus be appreciated that with the foregoing unique arrangement of pins 42 and 50 and arms 31 and 33, the magnitudes of the pivotally biasing magnetic force between arms 32 and 33 and the associated pins 42 and 50 respectively decrease on the index wheel driving strokes thereof as the arms pivot away from their respective pins. The energy losses due to frictional engagement between each of the pallet arm tips 46 and 47 and teeth 36 toward the ends of the respective drive strokes and at the beginning of their return strokes are accordingly significantly less than the frictional losses occasioned at the beginning of the power strokes and toward the end of the return strokes. Net overall reduction in frictional loss is thus accomplished. It is also significant that with the foregoing described unique disposition of arms 32 and 33 and magnetic pins 42 and 50 and their positions on tables 30 and 31 relative to pallet 10, the index wheel 38 is stepped forwardly for rocking movement of pallet 10 in either direction, as will become apparent with reference to the following description of the indexing sequence.

Starting with pallet 10 in the banked position as shown in FIGURE 1, and assuming roller 26 is rotating counterclockwise, pin 28 engages within recess 20 to pivot pallet 10 about axis 12 in a clockwise direction. At the beginning of this stroke, tip 46 of arm 32 is engaged between teeth 36 and is being maintained thereagainst with a maximum magnetic force as the spacing, if any, between arm 32 and magnetic pin 42 is minimal. Clockwise rotation of pallet 10 forces arm 32 forwardly to rotate index wheel 38 in a clockwise direction while arm 32 simultaneously pivots in a counterclockwise direction relative to table 30 about axis 34 to pivot outwardly away from pin 42. The magnetic attraction between arm 32 and pin 42 accordingly decreases as the distance therebetween increases and this occurs on the driving stroke of arm 32. The decreased magnetic attraction reduces the bearing pressure of tip 46 against teeth 36 and accordingly the frictional energy loss between tip 46 and teeth 36 progressively decreases until pallet 10 is fully rotated in the clockwise direction to bear against banking pin 19. At this point, arm 32 is virtually tangent to wheel 38 and slightly inwardly spaced from outer banking pin 44. The magnitude of magnetic attraction between arm 32 and pin 42 at this point maintains tip 46 in following engagement against teeth 36 with extremely slight pressure, sufficient only to overcome the friction of arm 32 at pivot 34.

As pallet 10 pivots clockwise, arm 33 is withdrawn over the next succeeding tooth remaining substantially constantly spaced from magnetic pin 50 until it drops from such tooth and pivots clockwise relative to table 31 from its slightly outwardly spaced position relative to pin 52 as seen in FIGURE 1 toward magnetic pin 50 under the force of the magnetic attraction between pin 50 and arm 33. The magnetic attraction between pin 50 and arm 33 at the beginning of the return stroke thereof is of a magnitude sufficient only to maintain the tip of arm 33 in following engagement along teeth 36. As arm 33 pivots clockwise toward pin 50, the magnetic attraction therebetween remains substantially constant until arm 33 drops off the next tooth just prior to pallet 10 being pivoted against banking pin 19, at which time arm 33 is slightly spaced from and attracted to pin 50 with maximum magnetic force, as seen in FIGURE 3. In this latter position, arm 33 is fully returned ready to drive wheel 38. It will be appreciated therefore that the bearing pressure or drag of tip 47 along teeth 36 on its return stroke increase in a stepped fashion from a minimum initial value incurring initial minimal frictional loss to a maximum value at the end of the return stroke. The frictional loss therefore increases in a stepped fashion from a minimum value at the beginning of the return stroke of arm 33 to a maximum value at the end of the return stroke thereof. The net frictional loss is approximately a constant value equal to the summation of the losses on the driving and return strokes of arms 32 and 33, which loss is significantly and considerably less than twice the maximum friction loss at the end of the drive stroke and approximates the frictional loss occasioned upon initial movement of one of the arms on its drive stroke.

Assuming that pallet 10 has pivoted clockwise to the extent possible and bears against banking pin 19, and that roller 28 has completed its counterclockwise excursion from recess 20 and is now returning on the clockwise oscillation thereof, pin 28 engages within recess 20 to pivot pallet 10 counterclockwise about axis 12. Having completed its drive stroke as hereinbefore described, arm 32 is withdrawn from wheel 38 by the counterclockwise pivoting of pallet 10 with tip 46 of arm 32 being maintained in following engagement along teeth 36 by the magnetic attraction between pin 42 and arm 32 which causes arm 32 to pivot clockwise relative to table 30 on its return stroke. The magnitude of the magnetic attraction between arm 32 and pin 42 is minimal and sufficient only to maintain following engagement between tip 46 and teeth 36 at the beginning of the return stroke as arm 32 and pin 42 are spaced a maximum distance apart at that point. The bearing pressure of and the frictional loss occasioned by the contact between tip 46 and teeth 36 is therefore minimal at the beginning of the return stroke and increases to a maximum value when arm 32 is fully returned.

At the beginning of the counterclockwise stroke of pallet 10, arm 33 is closely spaced to or may abut pin 50 and, as table 31 pivots toward index wheel 38, arm 33 pivots counterclockwise relative to table 31 to drive index wheel 38 in a like forward direction as on the opposite stroke of pallet 10 until pallet 10 is fully pivoted and bears against banking pin 18. Counterclockwise movement of arm 33 increases the spacing between arm 33 and pin 50, thereby decreasing the magnetic attraction therebetween. Consequently, the bearing pressure of the tip of arm 33 against teeth 36 decreases from a maximum value at the beginning of the drive stroke to a minimum value at the end of the drive stroke sufficient only to maintain the tip 47 of arm 33 in following engagement against teeth 36. The frictional losses accordingly decrease as the bearing pressure decreases. At the end of the counterclockwise stroke of pallet 10, roller pin 28 completes its clockwise excursion from recess 20 and returns on a counterclockwise excursion to begin another indexing cycle.

It is thus seen that the unique configuration of the arms and the arrangement of pins provides for minimal frictional losses between the tips 46 and 47 of arms 32 and 33 respectively and teeth 36. For example, on the drive stroke of one arm, the frictional loss occasioned by such driving arm progressively decreases from a maximum value as the arm is spaced further from its associated magnetic pin, while the frictional losses of the other arm on the return stroke thereof increase from a minimum value to a maximum value at the completion of the return stroke. Thus, the net frictional loss is very nearly a constant in both directions of pallet movement and of a magnitude at any one time not significantly greater than the frictional loss occasioned by the initial movement of a single driving arm away from its associated magnetic pin at the beginning of its driving stroke. It is also significant that the driving action of the present index mechanism is of the double pallet type, that is, a drive force is exerted on the index wheel and the wheel is advanced unidirectionally for each stroke of the pallet. The frictional losses remain constant throughout each of the drive strokes and accordingly the system does not subject the motive force thereof to the varying resistances and perturbations.

The invention may be embodied in other specific forms without departing from the spirit or essential characteristics thereof.

What is claimed and desired to be secured by United States Letters Patent is:

1. An index mechanism for a watch comprising a pallet mounted for rocking movement, a balance staff adapted for oscillating movement, means on said balance staff to engage said pallet to impart said rocking movement to said pallet as said balance staff oscillates, an index wheel having peripheral teeth and adapted to drive a watch gear train, a pallet arm pivotally carried by said pallet, said pallet arm having a tip portion for engaging the teeth on said index wheel during said rocking movement to rotate said index wheel in one direction, and magnetic means cooperating between said pallet and said pallet arm to magnetically bias said pallet arm for pivotal movement into engagement against the teeth on said index wheel.

2. An index mechanism according to claim 1 wherein said magnetic bias pivots said arm into following engagement against the teeth on said index wheel.

3. An index mechanism according to claim 1 wherein the pivotal axis of said pallet arm lies laterally to one side of a straight line intersecting the pivotal axes of said index wheel and said pallet, said pallet arm extending from the pivotal axis thereof inwardly of a straight line intersecting the pivotal axes of said pallet arm and said index wheel.

4. An index mechanism according to claim 3 wherein said magnetic means comprises a magnetic pin mounted on said pallet.

5. An index mechanism according to claim 4 wherein said pin is mounted laterally outwardly of said pallet arm.

6. An index mechanism according to claim 1 wherein the pivotal axis of said pallet arm lies laterally to one side of a straight line intersecting the pivotal axes of said index wheel and said pallet, said pallet arm extending from the pivotal axis thereof outwardly of a straight line intersecting the pivotal axes of said pallet arm and said index wheel.

7. An index mechanism according to claim 6 wherein said magnetic means comprises a magnetic pin mounted on said pallet.

8. An index mechanism according to claim 7 wherein said pin is mounted laterally inwardly of said pallet arm.

9. An index mechanism according to claim 1 including a second pallet arm pivotally carried by said pallet, said second pallet arm having a tip for engaging the teeth on said index wheel, second magnetic means cooperating between said pallet and said second pallet arm to magnetically bias said second pallet arm for pivotal movement into engagement against the teeth on said index wheel, the first and second pallet arms alternately advancing said index wheel in response to rocking movement of said pallet in opposite directions.

10. An index mechanism according to claim 9 wherein said first and second pallet arms are pivotally mounted on said pallet on opposite sides of a straight line intersecting the pivotal axes of said index wheel and said pallet, said first pallet arm extending from its pivot outwardly of a straight line joining its pivotal axis with the pivotal axis of said index wheel, said second pallet arm extending from its pivot inwardly of a straight line joining its pivotal axis with the axis of said index wheel.

11. An index mechanism according to claim 10 wherein said first and second magnetic means comprise first and second magnetic pins carried by said pallet adjacent respective inner and outer sides of said first and second pallet arms.

12. An index mechanism according to claim 11 wherein said first pallet arm rotates from said first magnetic pin during the index wheel rotating stroke thereof in response to rocking movement of said pallet in one direction while said second pallet arm rotates toward said second magnetic pin on its return stroke, said second pallet arm rotating away from said second magnetic pin during the index wheel rotating stroke thereof in response to rocking movement of said pallet in the opposite direction while said first pallet arm rotates on its return stroke toward said first magnetic pin.

13. An index mechanism according to claim 9 including third and fourth pins mounted on said pallet respectively adjacent the outer and inner sides of said first and second pallet arms to limit pivotal movement of said arms away from said magnetic pins.

References Cited

UNITED STATES PATENTS

| 2,724,235 | 11/1955 | Bäuerle | 58—117 |
| 2,669,089 | 2/1954 | Strumann | 58—121 |
| 3,377,874 | 4/1968 | Scott | 58—116 X |

FOREIGN PATENTS 885,865  12/1961  Great Britain.

OTHER REFERENCES

German Printed Application No. 1,244,265, July 1967, United States Time Corp., class 58, subclass 116, 3 shts. dwg. 4 pp. spec.

Netherland's Printed Application No. 034,49/66 January 1967, Frielink, class 58, subclass 23, 1 sht. dwg. 7 pp. spec.

RICHARD B. WILKINSON, Primary Examiner.

STANLEY A. WAL, Assistant Examiner.

U.S. Cl. X.R.

58—116; 74—1.5